(12) United States Patent
Shkurikhin et al.

(10) Patent No.: US 8,452,143 B2
(45) Date of Patent: *May 28, 2013

(54) HIGH POWER FIBER LASER SYSTEM WITH HIGH QUALITY BEAM

(75) Inventors: Oleg Shkurikhin, Shrewsbury, MA (US); Dimitry Mochalov, Burbach (DE); Asya Zakharova, Burbach (DE)

(73) Assignee: IPG Photonics Corporation, Oxford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/446,036

(22) Filed: Apr. 13, 2012

(65) Prior Publication Data

US 2012/0201495 A1      Aug. 9, 2012

Related U.S. Application Data

(63) Continuation of application No. 12/360,693, filed on Jan. 27, 2009, now Pat. No. 8,160,415.

(51) Int. Cl.
  *G02B 6/04*      (2006.01)
(52) U.S. Cl.
  USPC .......................................... 385/115; 385/121
(58) Field of Classification Search
  USPC .................................. 385/115, 121
  See application file for complete search history.

(56) References Cited

U.S. PATENT DOCUMENTS

| | | | | |
|---|---|---|---|---|
| 5,016,963 | A * | 5/1991 | Pan ................................. | 385/33 |
| 5,412,745 | A * | 5/1995 | Weidman et al. ............... | 385/43 |
| 5,459,804 | A * | 10/1995 | Stowe ............................ | 385/42 |
| 7,236,671 | B2 * | 6/2007 | Rasmussen .................... | 385/115 |
| 7,274,717 | B1 * | 9/2007 | Minden et al. .................. | 372/6 |
| 7,460,755 | B2 * | 12/2008 | Bruesselbach et al. ........ | 385/116 |
| 7,532,792 | B2 * | 5/2009 | Skovgaard et al. ............. | 385/39 |
| 7,839,901 | B2 * | 11/2010 | Meleshkevich et al. ........ | 372/6 |
| 8,160,415 | B2 * | 4/2012 | Shkurikhin et al. ............ | 385/115 |

* cited by examiner

*Primary Examiner* — Omar Rojas
(74) *Attorney, Agent, or Firm* — Yuri Kateshou; Timothy J. King

(57) ABSTRACT

A high power fiber laser system has a combiner configured of a plurality of single mode (SM) fibers which are fused together so as to define an output end of the fiber combiner. The fused SM fibers radiate respective fiber outputs, which collectively define a multimode (MM) combiner output. The SM fibers each are configured with such an optimally small numerical apertures (NA) that the MM combiner output is characterized by a minimally possible beam quality factor ($M^2$) for the plurality of SM fibers. To reduce the possibility of burning of the components of the fiber laser system with a multi-kilowatt combiner output, a coreless termination block is fused to the output end of the fiber combiner and configured so as to provide expansion of the combiner output without modifying the minimally possible $M^2$ factor thereof.

13 Claims, 3 Drawing Sheets

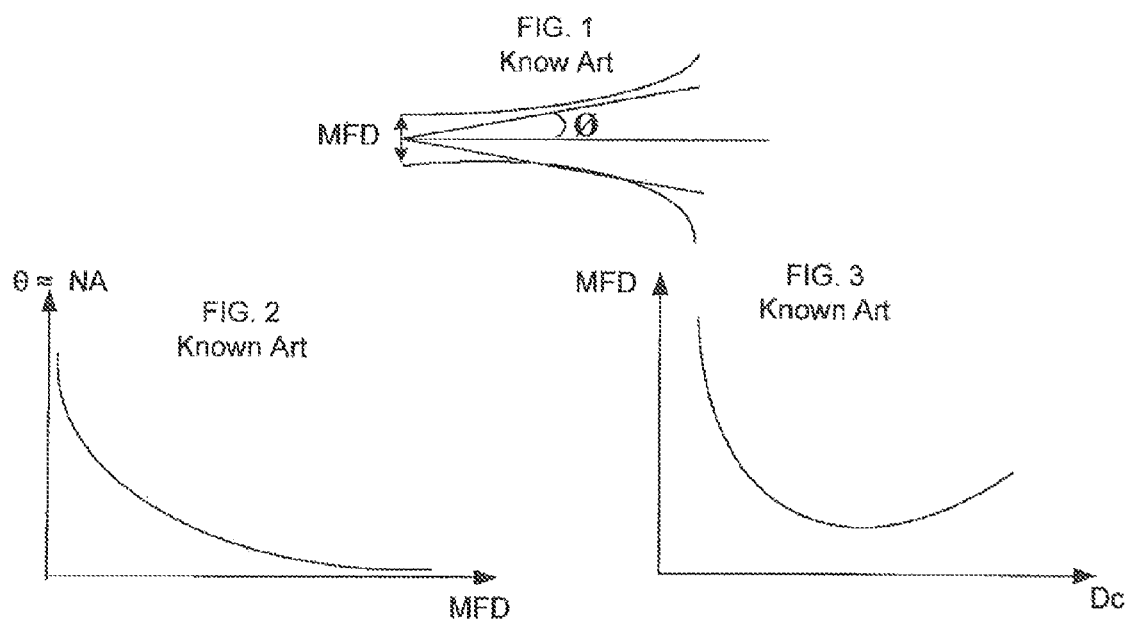
FIG. 1 Known Art
FIG. 2 Known Art
FIG. 3 Known Art
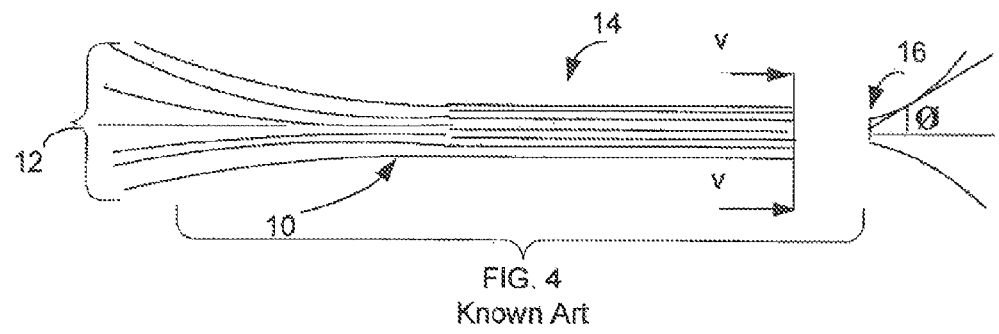
FIG. 4 Known Art
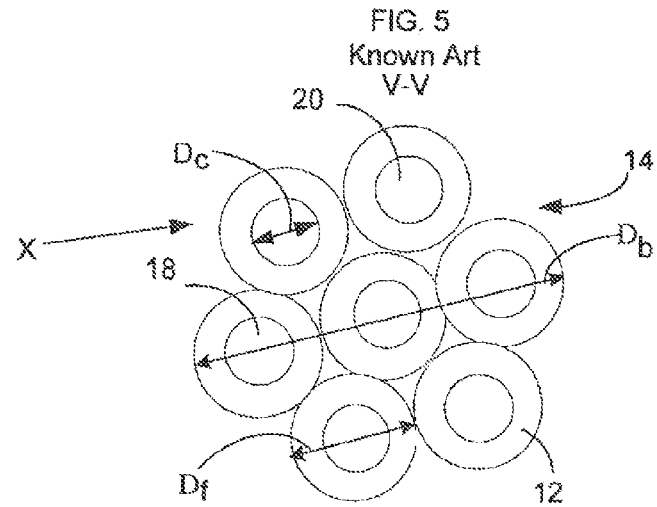
FIG. 5 Known Art
V-V

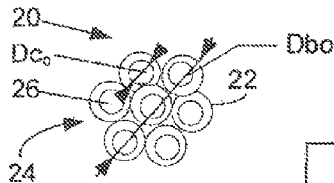
FIG. 6
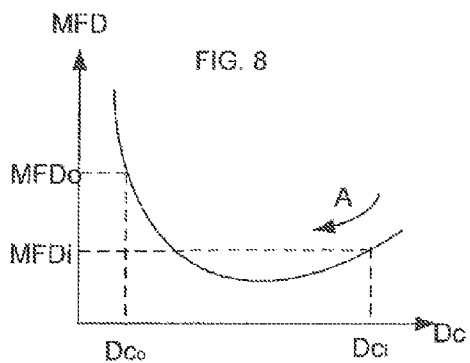
FIG. 7
FIG. 8
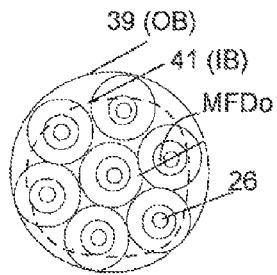
FIG. 10
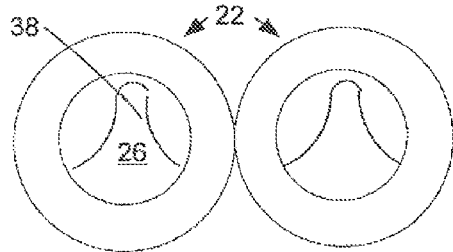
FIG. 9A
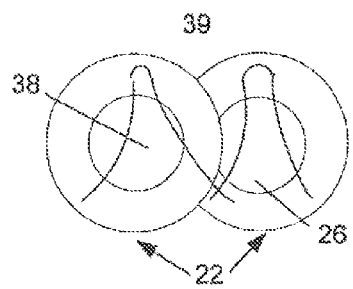
FIG. 9B FIG. 11
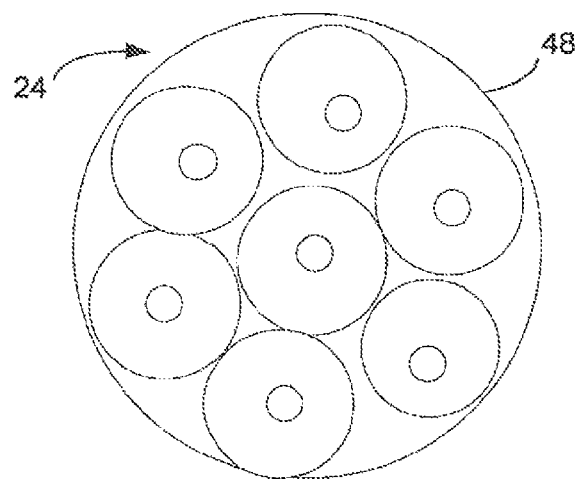
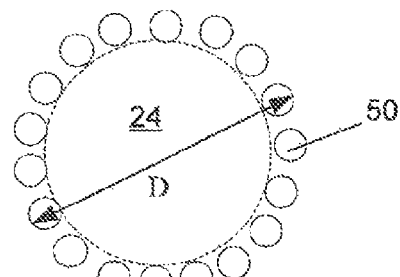
FIG. 12
FIG. 13
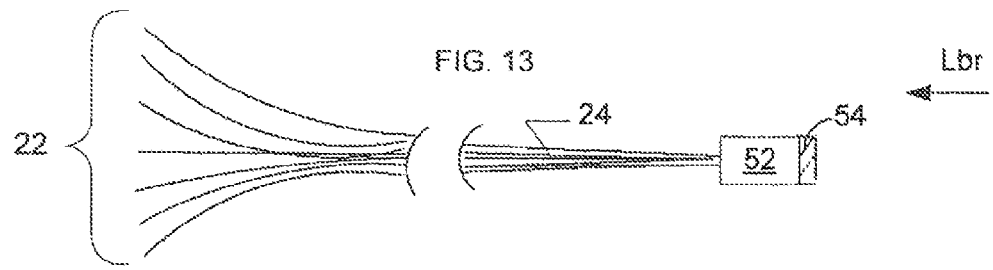
FIG. 14
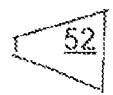
FIG. 15

HIGH POWER FIBER LASER SYSTEM WITH HIGH QUALITY BEAM

BACKGROUND OF THE DISCLOSURE

1. Field of the Disclosure

The invention relates to high power fiber laser systems. Particularly, the invention relates to a fiber combiner configured with a plurality of SM fiber lasers which collectively radiate a combiner output characterized by minimally possible $M^2$ factor.

2. Discussion of the Known Art

One of the most significant keys to ensuring broad marketability of fiber lasers is the development of producing ever-increasing laser output powers without sacrificing beam quality. Known for its high-quality beam, a single-mode (SM) fiber laser may deliver output powers approaching ten kilowatts.[1] Despite the impressive results, even higher power levels and beam quality are required for current and future industrial and military needs.

[1] For example, SM fiber lasers developed and manufactured by IPG Photonics Corporation, Oxford, MA, U.S.A.

It is known to power scale laser output by combining the outputs from several SM fiber lasers while sacrificing beam quality as the power increases. The combined single modes of respective fibers translate into a multimode (MM) combiner output. The beam quality may be characterized by an $M^2$ factor. The lower the $M^2$ factor, the higher the beam quality. In a diffraction-limited Gaussian beam, the $M^2$ factor is as low as one. The diffraction-limited beam is manifested by a single light spot. In some applications, the beam quality factor is not critical, in others, which are of interest here, it is.

FIG. 1 illustrates the concept of divergence of a Gaussian beam radiated by SM fiber. Quantitatively, the far-field divergence of the SM beam can be measured as $$\theta = \frac{2\lambda}{\pi MFD} \quad (1)$$

Wherein θ—divergence half-angle, MFD—mode field diameter. In single mode fibers, the half angle is correlated to a numerical aperture as follows:

$$\sin \theta = NA \quad (2)$$

Accordingly, the divergence of the SM beam can be controlled by changing the MFD, which is the waist diameter of the Gaussian beam in the SM fibers (FIG. 1).

FIG. 2, related to the above-disclosed equations, illustrates the dependence between the divergence or NA and MFD. The greater the MFD, the smaller the divergence. The MFD, in turn, depends on a core size Dc of SM fiber, as can be seen in FIG. 3. Seemingly, the limitless decrease of the core diameter causes the increase of the MFD. In reality, the MFD cannot be limitlessly increased without detrimentally affecting the beam quality, as discussed below.

FIGS. 4 and 5 illustrate a known fiber laser system 10 configured with combined multiple SM laser outputs 12 which are placed next to one another to form a combiner 14 with an output beam 16. Disclosed only as an example, seven parallel outputs of respective SM fiber lasers 12, each having a 125 μm outer diameter Df, define an effective area X of output light beam 16 with a 375 μm overall outer diameter Db.

Since SM fibers 12 do not experience external stresses, beams 18, propagating in respective cores 20, each have a Gaussian shape. The MFD of each propagating beam is relatively small, and therefore, a far field divergence thereof is broad. Superimposed with one another, seven distinct and spaced apart fiber outputs define combiner output 16 with a large effective area X. The large effective area of the beam, i.e. an imaginary boundary running around cladding of respective fibers 12, represents a broad far-field divergence or small numerical aperture and, therefore, a high $M^2$ factor of beam 16. In other words, system 10 radiates a low-quality, relatively unfocused combiner output.

The fiber laser system 10 not only radiates an output beam of poor quality, but also the system is labor- and cost-ineffective. After the combiner output diverges along seven fiber output paths, each fiber output is associated with a bulk optics (telescope) located along the fiber path. Only then seven fiber outputs converge toward one another. The necessity of seven additional bulk optic units adds labor efforts to the manufacturing and tuning process and, therefore, may make the combiner prohibitively expansive.

In practice, the terminal ends of respective fiber lasers 12, defining combiner 14, are often processed to reduce the effective area of output beam 16. However, as far as Applicants know, there are no established methods of controllably reducing the far-field divergence and $M^2$ factor for active or doped SM fibers. The "blind" minimization of the effective area of the combiner beam, however, may not lead to satisfactory results, such a low $M^2$ factor and small divergence of combiner output, as discussed hereinbelow.

A need, therefore, exists for a method of controllably manufacturing a fiber combiner operative to output a high power beam characterized by narrow far-field divergence or small numerical aperture (NA) and low $M^2$ factor.

A further need exists for a high power laser system with the disclosed combiner.

SUMMARY OF THE INVENTION

These needs are met by a high power laser system configured with a plurality of SM fiber lasers which are coupled together to define a fiber laser combiner. The combiner is operative to radiate a combiner output characterized by an optimally limited far-field divergence selected so that the combiner output has a minimally possible $M^2$.

In accordance with one aspect of the disclosure, disclosed is a method of configuring a fiber laser combiner having a low far-field divergence and, thus, high quality combiner output. Initially, terminal ends of respective peripheral SM fiber lasers are arranged around a terminal end of central SM fiber so as to define a combiner. The combiner is further exposed to heat and tension making the terminal ends simultaneously elongate and radially shrink. The reduction is monitored so that multiple fiber outputs each maintain a substantially Gaussian shape.

The desired result of the disclosed process is to have a combiner output having an optimally small far-field divergence which provides for the smallest possible $M^2$ factor. In order to achieve these objectives, the effective area of the combiner output, i.e., the cumulative radiation of individual SM fiber lasers should be as small as possible. The latter, in turn, is attained by minimizing individual fibers causing the minimization of both the numerical aperture (NA) of the individual fiber outputs and the NA the combiner output. The process provides for controllably reducing the core diameters of respective SM fiber lasers; otherwise, the individual fiber outputs each would loose its high beam quality $M^2$. Thus, the controllable reduction of the fiber core diameter and, therefore, numerical aperture of each SM fiber laser allows for a fiber output having optimally large MFD. Superimposed, a plurality of the fiber outputs define a small effective area of the multi-mode (MM) combiner output characterized by a minimally possible $M^2$ factor. As readily realized by the ordinary skilled worker, if a Gaussian shape of individual fiber outputs is maintained during the stretching of the combiner, the measured NA of each individual fiber output and the NA the combiner output are substantially the same.

As the cores of respective SM fiber lasers narrow, the divergence half angle and, therefore, numerical aperture of each SM fiber laser is continuously measured so as to not exceed a reference value, as disclosed below. Alternatively or in addition to the measurement of the half-angle of each fiber output, the half-angle of the combiner output may be measured. In either case, knowing the divergence of the fiber and/or combiner outputs, the $M^2$ factor can be determined. But the minimization of the NA aperture is not limitless because the mode of each fiber characterized by a mode field diameter (MFD) may expand into the outer boundary of the cladding of the fiber output. The outer boundary of the combiner's output is formed as a result of heating and stretching of the SM fiber lasers whose outer boundaries of respective claddings gradually merge with one another to eventually define the outer boundary of the combiner output. Even if a single individual mode reaches the outer boundary of the combiner output, the quality of the fiber output radically deteriorates. Accordingly, the combiner output of the disclosed combiner owns its high quality to the preservation of the Gaussian shape of each individual SM fiber output having an optimally small NA and, thus, $M^2$ as well as an optimally large MFD which are attained in accordance with the disclosed process.

A further aspect of the disclosure relates to the safety and effective operation of the above-disclosed combiner. As easily realized by the ordinary skilled artisan, the disclosed laser system may reach tens and tens of kW because the number of SM fiber lasers may very well reach a few tens and each SM laser may be configured with increasingly high output power. The power density of the combiner output is extremely high and may easily damage outer coatings covering the combiner's output fiber.

Furthermore, the use of the disclosed multi-kW laser system is associated with powerful backreflected light from the end surface while propagating upstream of the system, can easily destroy the SM fiber lasers. Typically, the effective configuration preventing propagation of backreflected light includes the presence of anti-reflecting (AR) coating. However, technologically, it is difficult to polish the combiner's output fiber so as to effectively apply the backreflecting coating thereto. Moreover, even if the combiner's output is covered by an AR coating, the power density is so high that it can easily destroy the AR coating.

Both of the above difficulties can be substantially simplified by providing a termination block configured with a quartz block which is fused to the downstream end of the combiner's output. The rational behind such a structure is simple. First, having the block with a relatively large inner diameter allows the combiner output beam to expand. As a consequence, the power density of the combiner output is reduced and, therefore, the possibility of damaging the outer coating is minimized. However, the beam of the combiner's light output does not loose its high quality, since the single modes of respective SM fiber outputs unlikely reach the outer boundary of the block, which otherwise would lead to the increase of $M^2$ factor. Further, the structure of block has a flat downstream end, which looks away from the combiner. The application of anti-reflecting material to such a flat face does not pose technological problems.

BRIEF DESCRIPTION OF THE DRAWINGS

The above and other details of the disclosure will become more readily apparent from the specific description of the disclosure accompanied by the following drawings, in which:

FIG. 1 illustrates the far-field divergence of a Gaussian-shaped beam.

FIG. 2 illustrates the dependence of the divergence from an MFD in SM fibers.

FIG. 3 illustrates the dependence of an MFD from a core size in SM fibers.

FIG. 4 illustrates a typical fiber combiner configured from multiple SM fiber lasers.

FIG. 5 is a cross-sectional view of the fiber combiner along lines V-V of FIG. 4.

FIG. 6 is a cross-sectional view of the disclosed combiner.

FIG. 7 illustrates a process of manufacturing the disclosed combiner.

FIG. 8 graphically illustrates one of the steps of the disclosed process of FIG. 7.

FIGS. 9A and 9B illustrate the modification of mode in a SM fiber laser as the latter is processed in accordance with the disclose process.

FIG. 10 illustrates the actual view of the effective area of radiation emitted by the disclosed combiner.

FIG. 11 illustrates one of the embodiments of the disclosed combiner.

FIG. 12 illustrates still another embodiment of the disclosed combiner.

FIG. 13 illustrates the disclosed fiber laser system provided a termination block.

FIG. 14 illustrates one of the embodiments of the termination block of FIG. 13.

FIG. 15 illustrates the other embodiment of the termination block of FIG. 13.

SPECIFIC DESCRIPTION

Reference will now be made in detail to the disclosed combiner. Wherever possible, same or similar reference numerals are used in the drawings and the description to refer to the same or like parts or steps. The drawings are in simplified form and are far from precise scale.

The combiner manufactured and configured in accordance with the disclosure is operative to radiate a combiner output which is resulted upon superimposition of a plurality of SM fiber outputs each having an optimally low far-field divergence or numerical aperture and, thus, smallest possible $M^2$ for the combiner output.

FIG. 6 illustrates the end view of the disclosed high power fiber laser system 20 including a combiner 24. A plurality of SM fibers lasers 22, which are further referred to as SM fibers, have respective terminal ends placed in parallel to one another which are further heated and stretched so that the claddings of respective SM fibers 22 collectively define combiner 24 with a diameter Dbo, whereas each fiber 22 has a core diameter Dco. While the overall, odd or even number of SM fiber lasers 22 may broadly vary and be limited only by technological restrictions, illustrated combiner 24 has seven SM fibers 22. In comparison to the prior art combiner 14 of FIG. 5, the dimensions of each fiber 22 and, therefore, the outer diameter of combiner 24 are substantially smaller than the corresponding dimensions of combiner 14.

The terminal ends of respective SM fibers 22 may be arranged similarly to that one of the shown prior art, i.e. multiple peripheral SM fiber lasers are disposed around the central SM fiber. The core 26 of each fiber 22 is doped with rare-earth elements including, but not limited to, erbium, ytterbium, neodymium, dysprosium, praseodymium, and thulium.

One of salient features of the disclosure relates to controllable radial reduction of combiner 24 and each of SM fibers 22. The main objective of such a reduction is to provide each SM fiber 22 with core 26 having such a maximally reduced diameter Dco that would allow for the optimally small NA of the fiber output. Such a configuration of individual SM fibers 22 would lead to the smallest possible $M^2$ factor of the combiner output for a given number of SM fibers 22. The maximally reduced core diameter Dco of fiber 22 is a core diameter which each SM fiber 22 may have while still radiating a fiber output characterized by a Gaussian shape and maximally possible or optimal MFDo. The core diameter smaller than the maximally reduced Dco and the MFD greater than optimal MFDo create conditions under which the fiber outputs looses the Gaussian shape. In other words, a SM fiber with the geometry differing from that one with the optimal core diameter Dco and, therefore, optimal NAo would emit an inferior fiber output. Once the fiber outputs of respective SM fibers 22 each are characterized by the optimally small NA, the combiner's output beam has a minimally possible low far-field divergence with smallest possible $M^2$ factor—the highest possible beam quality.

FIG. 7 illustrates a process for controllably reducing combiner 24 so that the core diameter of each SM fiber 22 is reduced to the optimally minimal core diameter (reference) Dco corresponding to a maximally possible or optimal MFDo. Both of these optimal reference values, Dco and MFDo, are empirically obtained values. Similar to the known art, terminal ends of respective SM fibers 22 are placed around the terminal end of the central fiber laser so as to form combiner 24 in a step 28. In step 30, combiner 24 is exposed to elevated temperatures and tension forces tending to adiabatically stretch and, therefore, radially reduce combiner 24. For example, combiner 24, including seven SM fibers 22, each having a 125 μm outer diameter, may have optimal outer combiner diameter Dbo radially minimized to 50, 60 or 70 μm.

FIGS. 8, 9A, 9B and 10 illustrate modifications occurring in single fiber 22 during step 30 of FIG. 7. Referring to FIG. 9A, the fiber output of each individual SM fiber 22, (only two adjacent SM fiber laser 22 are shown), has a Gaussian shape 38, and an MFDi corresponding to an initial core diameter Dci of FIG. 8. The diameter Dci is not arbitrarily shown on the curve. In practice, the core diameter Dci of each SM fiber laser 22, as shown, is very convenient because of 1. substantial mode-matching with standard passive (undoped) fibers and, thus, low losses at splices, and 2. cut-off wavelengths occurring before respective operating wavelengths. However, as mentioned above, the MFDi corresponding to core diameter Dci may be small and, thus, the divergence angle and numerical aperture may be large while the effective area of combined, but not tapered fibers may be large. Consequently, plurality of SM fibers 22 configured in accordance with the above-disclosed parameters lead a poor quality combiner output of combiner 24 which has a broad far-field divergence and, thus, a high $M^2$ factor.

As combiner 24 radially reduces, so does initial core diameter Dci of each SM fiber 22. Looking at FIG. 8, it can be seen that the MFD of the output of SM fiber 22 first gradually decreases before this trend is reversed. The enlargement of MFD is explained by expansion of mode 38 of each SM fiber output gradually coupling out of core 26, as shown in FIG. 9B, into the cladding of SM fiber 22. In accordance with the disclosed process, the expansion of mode 38 stops short off an outer boundary 39 of the cladding of SM fiber laser 22 which defines a segment of the outer boundary OB of reduced combiner 24 as interstices between adjacent claddings of respective fibers 22 get smaller during step 30. If the mode 38 reaches outer boundary 39, the SM fiber output looses its Gaussian beam shape, and the overall quality of the combiner output deteriorates. On the other hand, it is desirable that the modes of adjacent fiber laser outputs expand so as overlap with one another since, as modes 38 of respective SM fiber lasers move closer to one another. As a result, effective area 41 (FIG. 10) of the combiner output, i.e., the inner boundary IB encircling the tips of the modes, tends to become smaller which, obviously, leads to the smaller. $M^2$ factor of the combiner output.

Returning to FIG. 7, in order to avoid the coupling of any single mode into the boundary of the reduced combiner 24, the divergence angle (NA) of each individual SM fiber output and overall combiner output are continuously measured in step 32 by methods known to the artisan. Since in SM fibers 22 the half-divergence angle corresponds to a NA, knowing the latter a central processing unit (not shown) can calculate a corresponding MFDm of individual SM fiber output as indicated by step 34 in accordance with the following equation:

$$MFDm = \frac{4\lambda}{\pi 2NA} \quad (3)$$

where λ is a known lasing wavelength, and NA (divergence half-angle) is a known NA of SM fiber. As readily realized by one of ordinary skills in the art NAmeasured of the combiner output is the same as the NA of each SM fiber 22 provided, of course, the fiber output preserves a Gaussian shape.

The MFDm of each SM fiber 22 is continuously determined and compared to the optimal diameter MFDo in step 34. Once the measured MFDm is substantially the same as MFDo, the process continues as disclosed immediately above.

The beam quality factor of the combiner output is determined in as $$M^2 = \frac{NAmeasured}{NAideal}$$

Since the NAmeasured of the combiner output is substantially the same as that one of SM fiber 22 and, thus, known, it is necessary to determine NAideal. Only the MFD, as a concept, cannot be applied to the combiner output since the latter is a MM beam. Accordingly, instead of measuring the MFD, the effective area EA of the combiner output is determined in step 35 as $$EA \approx MFDo \times n \quad (5)$$

wherein MFDo is experimentally selected, and n is a number of fused and diametrically aligned SM fibers 22 (for example, three of FIG. 10) delimited by the outer boundary 39 (FIG. 10) of the combiner output. Once the EA is determined, the NAideal can be determined in step 36 as follows:

$$NAideal = \frac{4\lambda}{\pi 2EA} \quad (6)$$

Having determined NA ideal for the calculated EA, the beam quality factor is determined in step 44 according to equation 4. While determining the Mm² factor, it is compared to the desired factor of the combiner output, which is determined based on the selected optimal values of the Dco and MFDo of SM fiber.

If, however, the quality of the combiner output is not sufficiently high, which may happen even if the optimal values of SM fiber outputs have been reached, the process continues as indicated by step 46. The M² of the combiner output still may be high because of several factors. One, of course, the NA and, therefore, MFDo of each SM fiber output may not be optimal and, thus, may be further enlarged provided that the SM output preserves a Gaussian shape. Typically, however, a high M² factor is a consequence of excessively large MFD of SM fiber outputs which have reached the outer boundary 39 (FIG. 10) of the combiner output. The reduction of the beam quality factor can be realized by structures illustrated in FIGS. 11 and 12.

To minimize a possibility of coupling of individual modes into the boundary of the combiner output, the boundary should be expanded. FIG. 11 diagrammatically illustrates a sleeve 48 with a diameter D receiving combiner 24 so as to be stretched therewith. As a result, sleeve 48, when heated and stretched, adds an extra layer to the boundary of the combiner's radiation. FIG. 12 shows a plurality of empty fibers or cords 50 defining diameter D and surrounding combiner 24, shown diagrammatically in phantom lines. The cords 50 function similarly to sleeve 48 of FIG. 11 and, thus, upon stretching, expand the boundary of the radiation.

Returning to FIG. 7, alternatively, instead of steps 32, 34, 36 and 37, step 40 provides for measuring a coefficient of core diameter attenuation. The coefficient of attenuation of core diameter 26 of SM fiber 22 is calculated as $$k = \frac{Dci}{Dcm},$$

where Dcm is a measured diameter. Then the coefficient of attenuation is continuously compared to an experimentally determined reference core diameter Dco in step 42 corresponding to maximum reduction of core diameter Dco beyond which the fiber laser's output ceases to have a Gaussian shape. After the desired coefficient has been reached, the process proceeds as disclosed above by first determining the combiner output beam quality factor M² in step 44 and subsequently, if needed, modifying it in step 46 in accordance with the techniques disclosed in conjunction with FIGS. 12 and 13.

Numerous experiments involving disclosed combiner 24 consisting of seven SM fiber lasers 22 show that the M² factor can be reduced from 7, which is a result of the configuration shown in FIG. 5, to 5 and even to 3. Considering that the combiner output can be as powerful as tens of kWs, the beam quality of combiner 24 is extremely high.

Of course, other methods of configuring combiner 24 with the desired beam quality factor can be used. For example, since the reduction of core diameter Dc and the outer diameter Dcl of the cladding of SM fiber laser 22 is proportional, the optimal coefficient of reduction Kr determined as $$kr = \frac{Dclo}{Dco}, \quad (7)$$

where Dclo is an experimentally established optimal diameter of the cladding. Once the optimal coefficient of reduction is achieved, the process may be stopped.

FIG. 13 shows a further aspect of the disclosure. As has been disclosed above, the power of the combiner output of the disclosed fiber laser system may reach tens of kWs. The enormous power of the combiner output poses two distinct problems. First, the backreflection from an end surface creates a backreflected light which, propagating back into combiner 24, may burn everything along its path. Second, an antireflection layer of material preventing the propagation of the backreflected light is difficult to directly apply to the output fiber of the combiner, because its outer surface is somewhat uneven and difficult to polish. Even if the AR coating is applied, it may be damaged because of a high power density.

The solution to both of the above-discussed problems includes the use of a coreless quartz termination block 52 fused to the output end of combiner 24. The combiner output expands within block 52 similar to the expansion of the beam in free space. Accordingly, separate fiber outputs each preserve its Gaussian shape and spatial relationship with one another, i.e., the modes of respective adjacent fiber outputs overlap one another like they would in free space without reaching the outer boundary of block 52. As a consequence, the combiner output or radiation has the same characteristics as obtained while using fiber laser system 20 of FIG. 6. However, a face 54 of block 52 is flat and relatively large which provides for an easy application of antireflection layer. Accordingly, the use of block 52 simplifies the technological process and provides protection of combiner 24 from the end surface backreflection.

FIGS. 14 and 15 illustrate respective modifications of the geometry of block 52. It is desirable that the opposing ends of respective combiner 24 and block 52 be comparably scaled which simplifies the splicing of these components. The opposite, downstream end of block 52 should be preferably greater than the upstream end thereof because, while the combiner output diverges, it is necessary to prevent its coupling into the boundary of the block. FIG. 14 illustrates block 52 having a frustoconical-shaped cross-section with opposite longitudinal sides of the block diverge from one another along the direction of propagation of forward light. Alternatively, FIG. 15 also illustrates block 52 with a frustoconically-shaped cross-section, but the longitudinal sides each have a stepwise configuration with the upstream end of block 52, which is coupleable to the opposing end of combiner 24, being small enough to losslessly couple to the combiner's output. Other shapes including, for example, cylindrical and polygonal shapes are contemplated within the scope of the disclosure.

Although there has been illustrated and described in specific detail and structure of operations, it is understood that the same were for purposes of illustration and that changes and modifications may be made readily therein by those skilled in the art without departing of the scope of this disclosure.

The invention claimed:
1. A method for configuring a fiber combiner comprising:
configuring a plurality of single mode ("SM") fibers each with an optimal numerical aperture (NA);
coupling the SM fibers to one another;
emitting outputs by respective SM fibers;
combining the outputs together in a multimode (MM) combiner output so that the combiner output has a minimally possible beam quality factor (M²), wherein the optimal NAs of SM fibers each is so selected that any NA lower than the optimal NA results in the $M^2$ of MM combiner output higher than the minimally possible $M^2$.

2. The method of claim 1, wherein the configuring of each SM fiber with the optimal NA includes structuring a core of the SM fiber with an optimal core diameter supporting a single mode with a largest possible mode field diameter (MFD), the largest MFD being a threshold above which the SM fiber output looses a Gaussian shape and the $M^2$ of the MM combiner output is higher than the minimally possible $M^2$ factor.

3. The method of claim 2, wherein the coupling of the SM includes fusing the SM fibers so that the MM combiner has an outer diameter provided with an outer boundary which is defined by fused claddings of respective SM fiber lasers.

4. The method of claim 3, wherein the fusing of the SM fibers terminates before the modes come in contact with the outer boundary of the MM combiner output.

5. The method of claim 2 further comprising forming a sleeve around the SM fibers, and fusing the sleeve with the SM fibers so that the modes do not touch the fused sleeve which defines the outer boundary of the MM combiner output.

6. The method of claim 2 further comprising providing a plurality of coreless fibers around the SM fibers, and fusing the coreless fibers with the SM fibers so that the coreless fibers form an outer boundary of the MM combiner output spaced radially from the SM modes.

7. The method of claim 1, wherein configuring of the SM fiber includes selecting an odd number of the SM fibers or an even number of the SM fibers.

8. The method of claim 1, wherein the optimal NA corresponds to a minimally possible far-field divergence of the combiner output.

9. The method of claim 1 further comprising
configuring a coreless termination block from quartz, and
fusing the block to an output of a combiner so as to preserve the combiner output with the minimally possible $M^2$ factor.

10. The method of claim 9, wherein the configuring of the block includes providing the block with one of cylindrical, polygonal or frustoconical cross-section.

11. The method of claim 9, wherein the configuring of the block further includes providing a peripheral wall of the block with a stepwise structure.

12. The method of claim 10 further comprising covering an free end of the termination block with an anti-reflection coating.

13. The method of claim 1, wherein the $M^2$ of the combiner vary between 3 and 5.

* * * * *